(12) United States Patent
Funagi

(10) Patent No.: US 10,410,063 B2
(45) Date of Patent: Sep. 10, 2019

(54) SETTING APPARATUS AND SETTING METHOD

(71) Applicant: CANON KABUSHIKI KAISHA, Tokyo (JP)

(72) Inventor: Tetsuhiro Funagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/334,004

(22) Filed: Oct. 25, 2016

(65) Prior Publication Data

US 2017/0039430 A1 Feb. 9, 2017

Related U.S. Application Data

(63) Continuation of application No. 13/924,021, filed on Jun. 21, 2013.

(30) Foreign Application Priority Data

Jun. 28, 2012 (JP) .................................. 2012-146086

(51) Int. Cl.
| | | |
|---|---|---|
| *G06K 9/00* | (2006.01) | |
| *G06K 9/32* | (2006.01) | |
| *G06T 7/246* | (2017.01) | |
| *G08B 13/196* | (2006.01) | |
| *G06F 3/0484* | (2013.01) | |

(52) U.S. Cl.
CPC ....... *G06K 9/00771* (2013.01); *G06K 9/3241* (2013.01); *G06T 7/246* (2017.01); *G06F 3/04842* (2013.01); *G06T 2207/30232* (2013.01); *G08B 13/19652* (2013.01); *G08B 13/19682* (2013.01)

(58) Field of Classification Search
None
See application file for complete search history.

(56) References Cited

U.S. PATENT DOCUMENTS

| | | | |
|---|---|---|---|
| 6,696,945 B1 | 2/2004 | Venetianer et al. | |
| 6,867,799 B2 | 3/2005 | Broemmelsiek | |
| 6,970,083 B2 | 11/2005 | Venetianer et al. | |
| 8,890,936 B2 | 11/2014 | Sharma et al. | |
| 9,412,268 B2 | 8/2016 | Saptharishi et al. | |
| 9,412,269 B2 | 8/2016 | Saptharishi et al. | |
| 9,536,164 B2 | 1/2017 | Funagi ................ | G06K 9/3241 |

(Continued)

FOREIGN PATENT DOCUMENTS

| | | |
|---|---|---|
| JP | 2003-085563 A | 3/2003 |
| JP | 2003-333584 A | 11/2003 |

(Continued)

OTHER PUBLICATIONS

Japanese Office Action dated Jun. 10, 2016 in Japanese Patent Application No. 2012146086.

(Continued)

*Primary Examiner* — Manuchehr Rahmjoo
(74) *Attorney, Agent, or Firm* — Venable LLP

(57) ABSTRACT

A setting apparatus for making a setting to detect that a moving object in an image has passed a line set in the image accepts designation of one of a position and a partial region in an object region in the image, and makes a setting to detect that the designated position or partial region in the object region of the moving object in the image has passed the line set in the image.

9 Claims, 13 Drawing Sheets

(56) References Cited

U.S. PATENT DOCUMENTS

| | | |
|---|---|---|
| 2002/0008758 A1 | 1/2002 | Broemmelsiek et al. |
| 2002/0171546 A1 | 11/2002 | Evans et al. |
| 2004/0105570 A1 | 6/2004 | Venetianer et al. |
| 2008/0018738 A1 | 1/2008 | Lipton et al. |
| 2009/0296991 A1 | 12/2009 | Anzola |
| 2010/0013931 A1 | 1/2010 | Golan et al. |
| 2012/0086780 A1 | 4/2012 | Sharma et al. |
| 2012/0114176 A1 | 5/2012 | Kawano ................ 382/103 |
| 2013/0162760 A1 | 6/2013 | Olavi |

FOREIGN PATENT DOCUMENTS

| | | |
|---|---|---|
| JP | 2005-506740 A | 3/2005 |
| JP | 2007-512738 | 5/2007 |
| JP | 2008-283726 A | 11/2008 |
| JP | 2010-128727 | 6/2010 |
| JP | 2012-103752 | 5/2012 |
| JP | 2014-011584 | 1/2014 |
| WO | 03/032622 A | 4/2003 |

OTHER PUBLICATIONS

Schneider Electric, "TAC—Video Analytics and Security: Using Data to Improve Safety and ROI", 2008, White Paper.
Sechidis, et al., "Low-Level Tracking of Multiple Objects", 2002, ISPRS Commission III, Symposium Photogrammetric Computer Vision, PCV'02.
JP Office Action dated May 31, 2019 in counterpart JP Application No. 2018-137080 with English translation.

SETTING APPARATUS AND SETTING METHOD

This application is a continuation of U.S. patent application Ser. No. 13/924,021, filed Jun. 21, 2013 (allowed), the contents of which are incorporated herein by reference.

BACKGROUND OF THE INVENTION

Field of the Invention

The present invention relates to a passage detection apparatus for an object in an image, and a setting apparatus and a method for passage detection.

Description of the Related Art

There is provided a technique of detecting an object in an image by performing image analysis. An object is detected from each frame image of a moving image using this technique, thereby performing object tracking on the moving image. Furthermore, as an application of the object tracking technique, a monitoring camera system or the like performs passage detection to determine whether an object has passed through a given region on an image plane.

For example, International Publication No. WO03/032622 discloses a technique of performing passage detection by analyzing, after a person in a captured image is segmented and a segmented image region overlaps a preset boundary line, whether the person has traversed in a designated direction.

As described above, if a segmented object has traversed in a designated direction, it can be detected that the object has passed. However, it is impossible to detect, with only this method, a case in which an object has gone beyond a designated boundary line. Furthermore, in this method, the timing when an apparatus determines that an object has passed may be different from the timing when the user wants to be notified that the object has passed.

SUMMARY OF THE INVENTION

According to an embodiment of the present invention, there is provided a detection apparatus, setting apparatus, and method which enable to flexibly set conditions for passage detection.

According to an embodiment of the present invention, there is provided a setting apparatus for making a setting to detect that a moving object in an image has passed a line set in the image, comprising: an acceptance unit configured to accept designation of one of a position and a partial region in an object region in the image; and a setting unit configured to make a setting to detect that one of the position and the partial region designated by the designation in the object region of the moving object in the image has passed the line set in the image.

According to an embodiment of the present invention, there is provided a passage detection apparatus comprising: an acceptance unit configured to accept designation of one of a position and a partial region in an object region in an image; and a detection unit configured to detect, based on one of the position and the partial region designated by the designation in the object region of a moving object in the image, that the moving object in the image has passed a line set in the image.

Further features of the present invention will become apparent from the following description of exemplary embodiments with reference to the attached drawings.

DESCRIPTION OF THE EMBODIMENTS

Preferred embodiments of the present invention will be described below with reference to the accompanying drawings.

Figure 1:
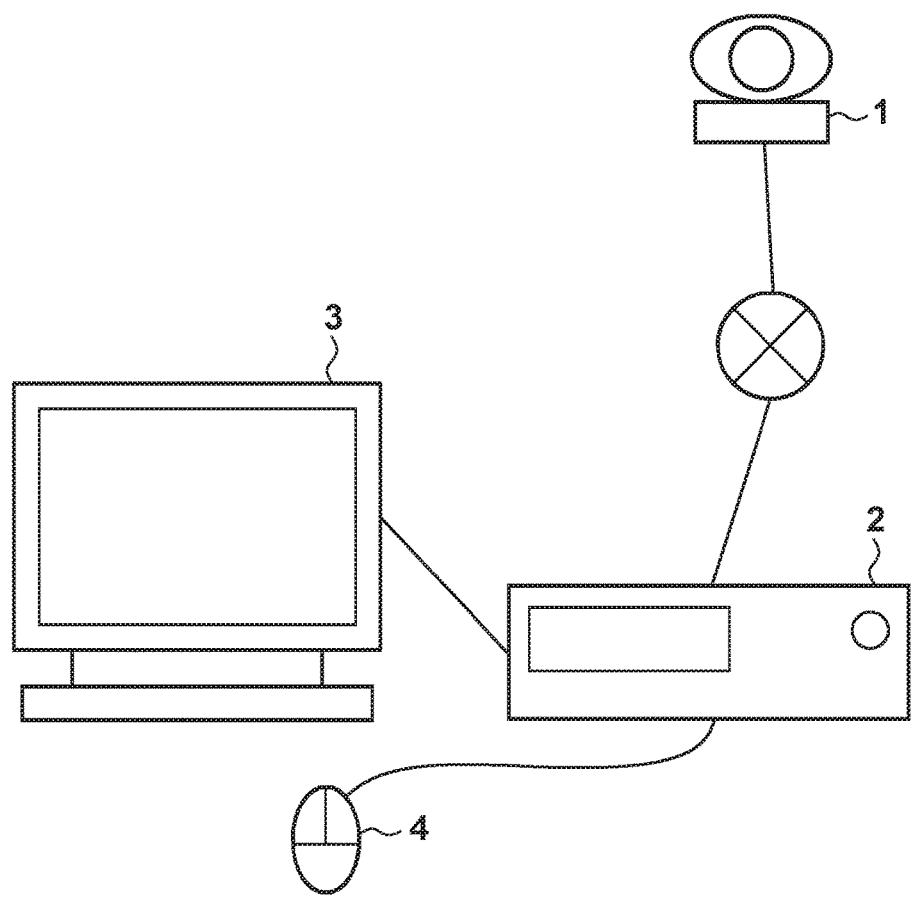
FIG. 1 is a view showing an example of the system configuration of a passage determination setting system according to the first embodiment.

A passage determination setting system according to the first embodiment will be described based on the accompanying drawings. FIG. 1 is a view showing an example of the system configuration of a passage determination setting system according to the first embodiment.

Referring to FIG. 1, an image capturing apparatus 1 is, for example, a network camera connectable to a network. An information processing apparatus 2 is implemented by, for example, a personal computer, and makes various settings for passage determination according to this embodiment, thereby generating determination setting information for passage determination. The image capturing apparatus 1 and the information processing apparatus 2 are connected to each other via, for example, the Internet or a local area network.

A display device 3 displays a graphical user interface generated by the information processing apparatus 2 for making passage determination settings. Reference numeral 4 denotes an input device which is used by the user to operate passage determination setting application software operating on the information processing apparatus 2.

Figure 2:
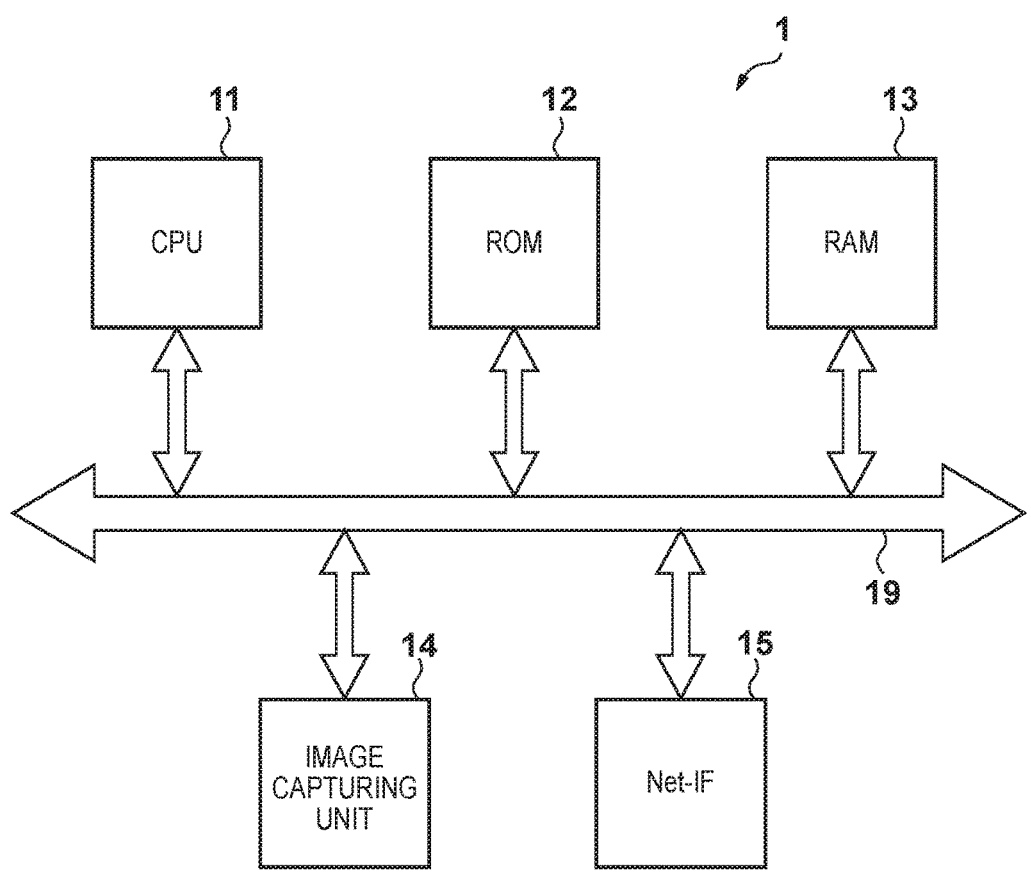
FIG. 2 is a block diagram showing the hardware arrangement of an image capturing apparatus 1 according to the first embodiment.

FIG. 2 is a block diagram showing an example of the hardware arrangement of the image capturing apparatus 1. As shown in FIG. 2, the image capturing apparatus 1 includes a CPU (Central Processing Unit) 11, a ROM (Read Only Memory) 12, a RAM (Random Access Memory) 13, an image capturing unit 14, a Net-IF 15, and a CPU bus 19.

The image capturing unit 14 includes a lens and a sensor, and outputs a digital image signal. The ROM 12 holds image capturing control software programs and information. The CPU 11 executes the control software programs stored in the ROM 12 to control respective devices. The RAM 13 has a work area for the CPU 11, an area in which information is saved in error processing, an area into which a control software program is loaded, an area for storing determination setting information (to be described later), and the like.

The image capturing apparatus 1 can perform wired or wireless communication with the information processing apparatus 2 via the network interface (Net-IF) 15. The CPU bus 19 includes an address bus, information bus, and control bus. Processing associated with some functions (to be described later with reference to FIG. 4) of the image capturing apparatus 1 is implemented when the CPU 11 executes processing based on the control software programs stored in the ROM 12.

Figure 3:
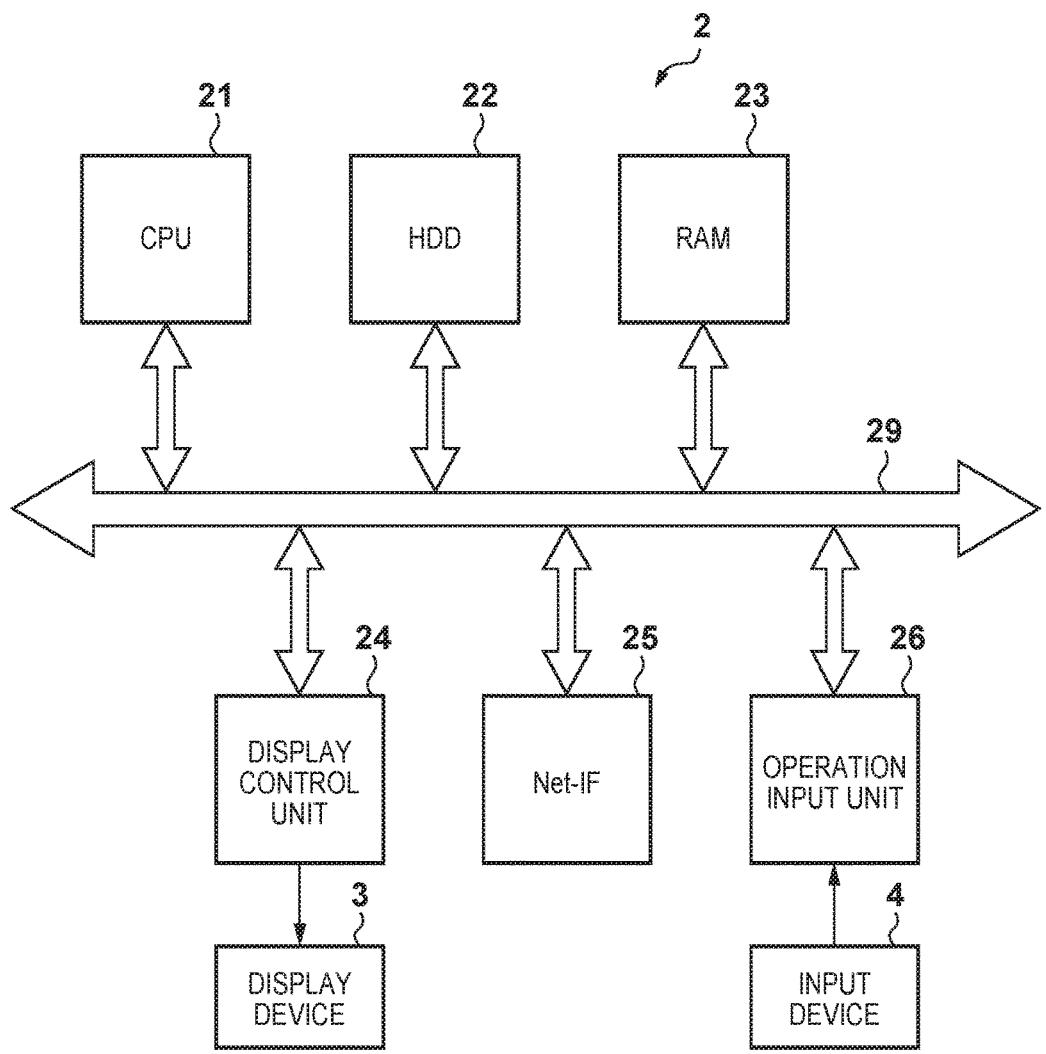
FIG. 3 is a block diagram showing an example of the hardware arrangement of an information processing apparatus 2 according to the first embodiment.

FIG. 3 is a block diagram showing an example of the hardware arrangement of the information processing apparatus 2. As shown in FIG. 3, the information processing apparatus 2 includes a CPU 21, an HDD 22, a RAM 23, a display control unit 24, an operation input unit 26, a network interface (Net-IF) 25, and a CPU bus 29. The HDD 22 holds information processing control software programs and information. The CPU 21 executes the control software programs stored in the HDD 22 to control respective devices.

The display control unit 24 performs display control of the graphical user interface displayed on the display device 3. The operation input unit 26 receives an input signal from the input device 4. The RAM 23 has a work area for the CPU 21, an area in which information is saved in error processing, an area into which a control software program is loaded, and the like. The network interface (Net-IF) 25 performs wired or wireless communication with the image capturing apparatus 1. The CPU bus 29 includes an address bus, information bus, and control bus. Processing associated with some functions (to be described later with reference to FIG. 5) of the information processing apparatus 2 is implemented when the CPU 21 executes processing based on the control software programs.

Figure 4:
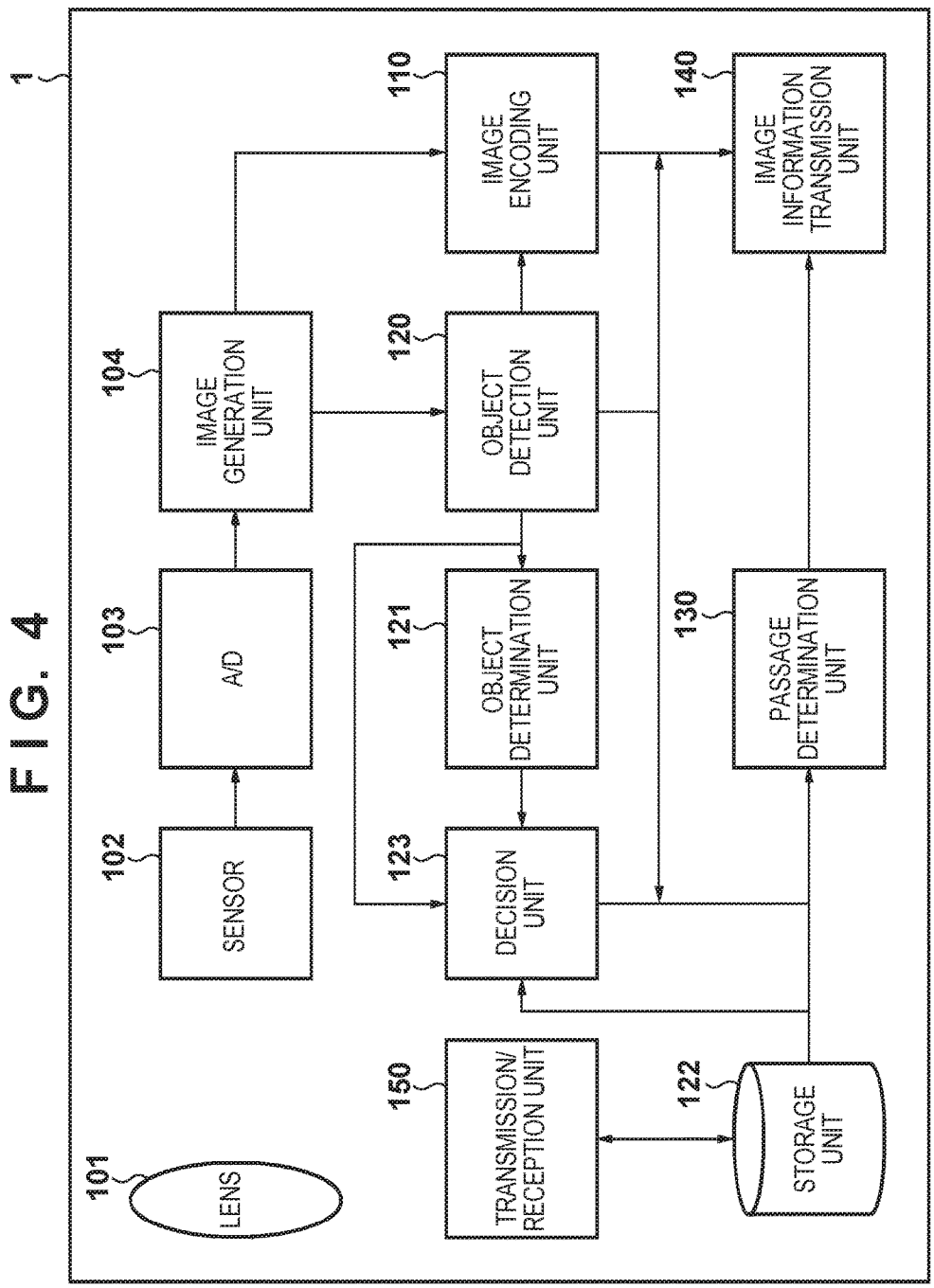
FIG. 4 is a block diagram showing an example of the functional arrangement of the image capturing apparatus 1 according to the first embodiment.

FIG. 4 is a block diagram showing an example of the functional arrangement of the image capturing apparatus 1. Each function shown in FIG. 4 is implemented by the hardware arrangement of the image capturing apparatus 1 shown in FIG. 2. For example, a lens 101, a sensor 102, and an A/D converter 103 shown in FIG. 4 are implemented as components of the image capturing unit 14 shown in FIG. 2. Each processing unit such as an image encoding unit 110 is implemented when the CPU 11 executes a program stored in the ROM 12.

Referring to FIG. 4, the sensor 102 includes an image sensor, and converts an optical image formed by the lens 101 into an electric signal, thereby outputting it as a sensor signal. The A/D converter 103 digitizes the sensor signal output from the sensor 102. An image generation unit 104 generates an image using the digital signal output from the A/D converter 103. The image encoding unit 110 encodes the image generated by the image generation unit 104.

An object detection unit 120 performs object detection by performing image analysis for the image (the image before encoding) generated by the image generation unit 104, and outputs object information containing the image features of an object detected in the image, and an object area indicating the range of the detected object in a predetermined shape. Note that the object detection unit 120 may compare the image with the background by a background difference method, thereby detecting an object. Based on the object information (image features) output from the object detection unit 120 and the distance between objects in a plurality of images, an object determination unit 121 determines whether the objects detected in the plurality of images are identical.

A storage unit 122 is constituted by, for example, the RAM 13, and holds determination setting information to be used by a decision unit 123 and a passage determination unit 130. The determination setting information contains position information indicating a position, in an object area, to be used for passage determination, and information for specifying a boundary line to be used for passage determination.

Using the determination setting information (position information) read out from the storage unit 122 and the object information (object area) detected by the object detection unit 120, the decision unit 123 decides, for each object existing in an image, a determination position in the object area to determine that the object has passed. The decision unit 123 also associates, with each other, determination positions in the object areas of the identical objects using a determination result by the object determination unit 121. Based on the positional relationship between the boundary line indicated by the determination setting information stored in the storage unit 122 and the determination positions of the identical objects associated with each other by the decision unit 123, the passage determination unit 130 determines whether the object has passed.

An image information transmission unit 140 transmits the image encoded by the image encoding unit 110, the object information detected by the object detection unit 120, and the passage determination result of the passage determination unit 130 to the information processing apparatus 2 via the Net-IF 15.

A transmission/reception unit 150 transmits/receives the determination setting information to/from the information processing apparatus 2 via the Net-IF 15. For example, the transmission/reception unit 150 receives the determination setting information set or updated in the information processing apparatus 2 to write it in the storage unit 122, and reads out the current determination setting information from the storage unit 122 to transmit it to the information processing apparatus 2.

Figure 5:
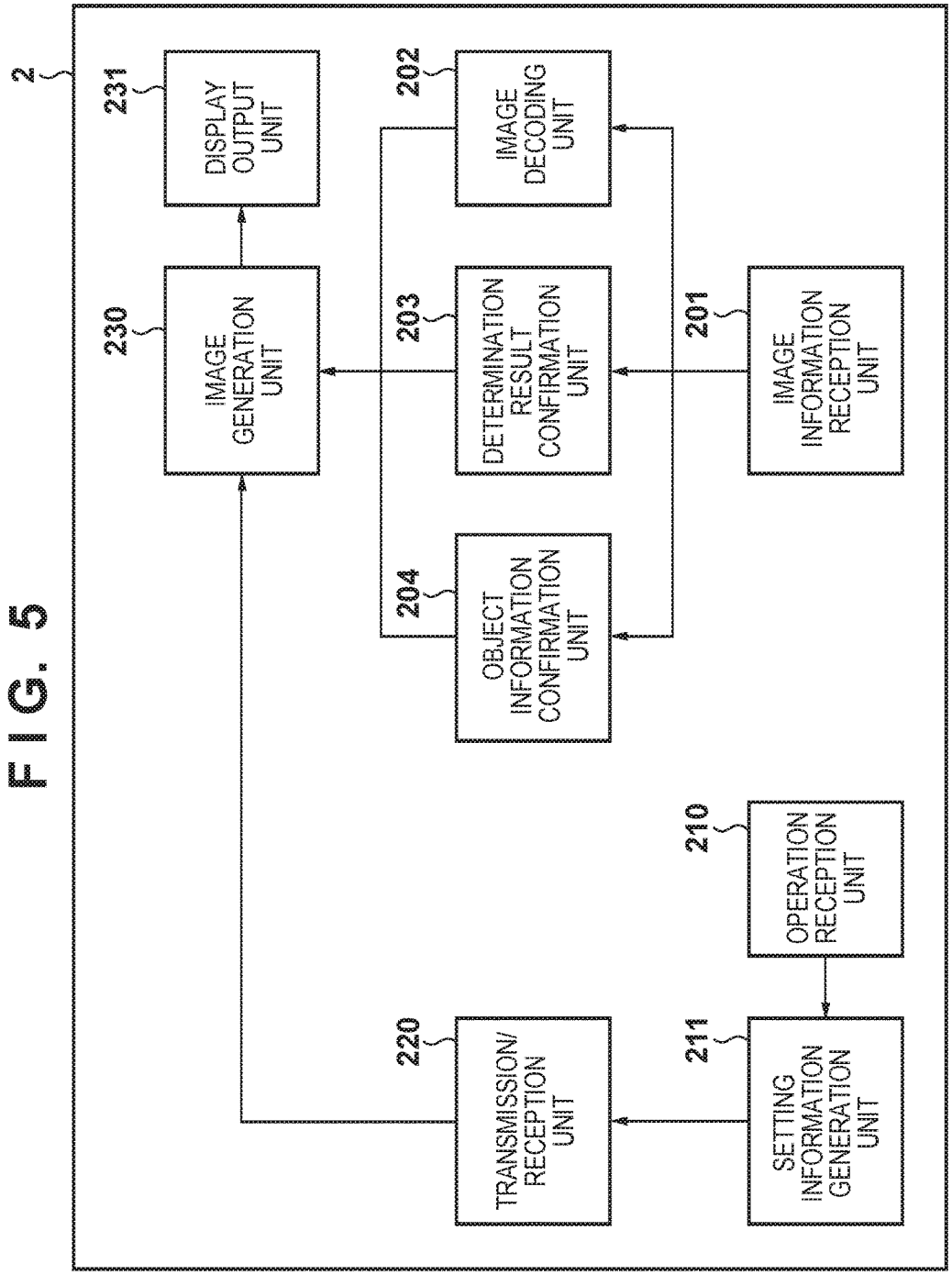
FIG. 5 is a block diagram showing an example of the functional arrangement of the information processing apparatus 2 according to the first embodiment.

FIG. 5 is a block diagram showing an example of the functional arrangement of the information processing apparatus 2. Each unit shown in FIG. 5 is implemented when, for example, the CPU 21 of the information processing apparatus 2 executes a program loaded from the HDD 22 into the RAM 23.

Referring to FIG. 5, an image information reception unit 201 receives, via the Net-IF 25, the information transmitted by the image information transmission unit 140 of the image capturing apparatus 1. An image decoding unit 202 decodes an encoded image contained in the information received by the image information reception unit 201, and provides the decoded image to an image generation unit 230. A determination result confirmation unit 203 confirms the passage determination result contained in the information received by the image information reception unit 201, and provides it to the image generation unit 230.

An object information confirmation unit 204 confirms the object information (object area) contained in the information received by the image information reception unit 201, and provides it to the image generation unit 230.

An operation reception unit 210 is implemented by the operation input unit 26. The operation reception unit 210 accepts an operation input from the input device 4 through the operation input unit 26. A setting information generation unit 211 generates/updates the determination setting information (the determination position and boundary line in the object area) for passage determination based on the operation received by the operation reception unit 210. A transmission/reception unit 220 transmits the determination setting information generated/updated by the setting information generation unit 211 to the image capturing apparatus 1 via the Net-IF 25, and receives the current determination setting information from the image capturing apparatus 1 via the Net-IF 25.

The image generation unit 230 generates an image to be displayed on the display device 3 using the decoded image, object information (object area), determination setting information, and passage determination result. A display output unit 231 is implemented by the display control unit 24, and outputs the image generated by the image generation unit 230 to the display device 3.

Figure 6:
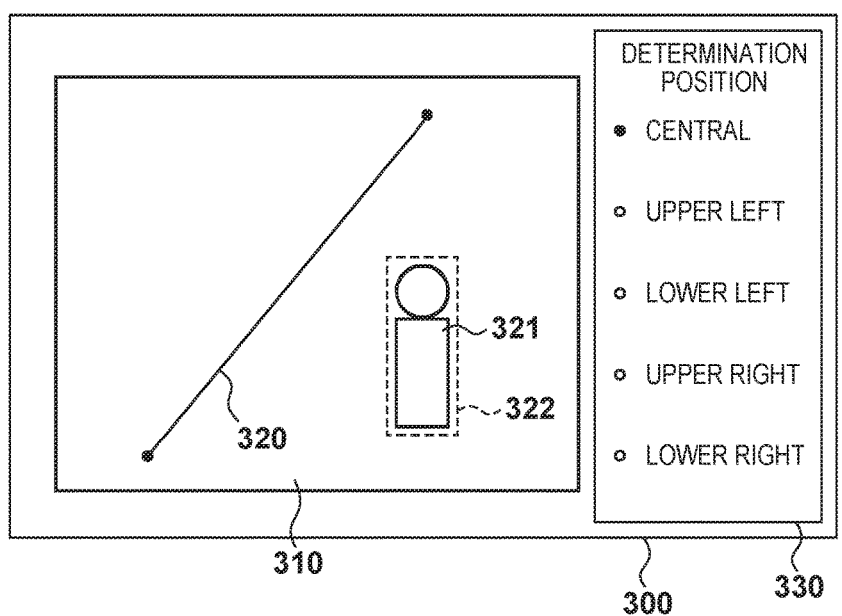
FIG. 6 is a view showing an example of a passage detection setting screen according to the first embodiment.

FIG. 6 shows an example of a passage determination setting screen displayed on the display device 3 by the display control unit 24 or display output unit 231. Referring to FIG. 6, an image display area 310 for displaying an image captured by the image capturing apparatus 1 is displayed on a display screen 300 of the display device 3. A boundary line 320 is a line for performing passage detection, and is generally called a trip wire.

An object 321 indicates a captured person, and an object area 322 indicates the area of the detected object 321. The object area is a rectangle circumscribing the object 321. Note that although the object area is formed by a rectangle in this embodiment, the present invention is not limited to this, and it is possible to apply a predetermined shape such as an ellipse. Furthermore, decision of an object area is well known.

A menu 330 is used to set a position in the detected object area to determine, if the position has passed the boundary line 320, that the object has passed.

Note that in the screen shown in FIG. 6, for descriptive convenience, a point is set as a determination position to perform passage determination, a list of a plurality of settable determination positions is displayed, and a determination position is selected by a radio button. In FIG. 6, it is possible to select, as a determination position, one of the central, upper left, lower left, upper right, and lower right positions of the object area. The menu 330 is not limited to that shown in FIG. 6, as a matter of course. Another example of a determination position setting will be described later in the second embodiment. Moreover, in the menu 330, the currently selected one of the plurality of determination positions which can be designated for selection is explicitly indicated by a filled radio button so that the user can identify it (the "central" determination position is currently selected in FIG. 6).

Note that in order for the user to identify the object which has been determined to have passed the boundary line 320, the image generation unit 230 changes the display mode (for example, the display color of the frame of the object area) of the object area of the object based on the passage determination information provided by the determination result confirmation unit 203.

Figure 7:
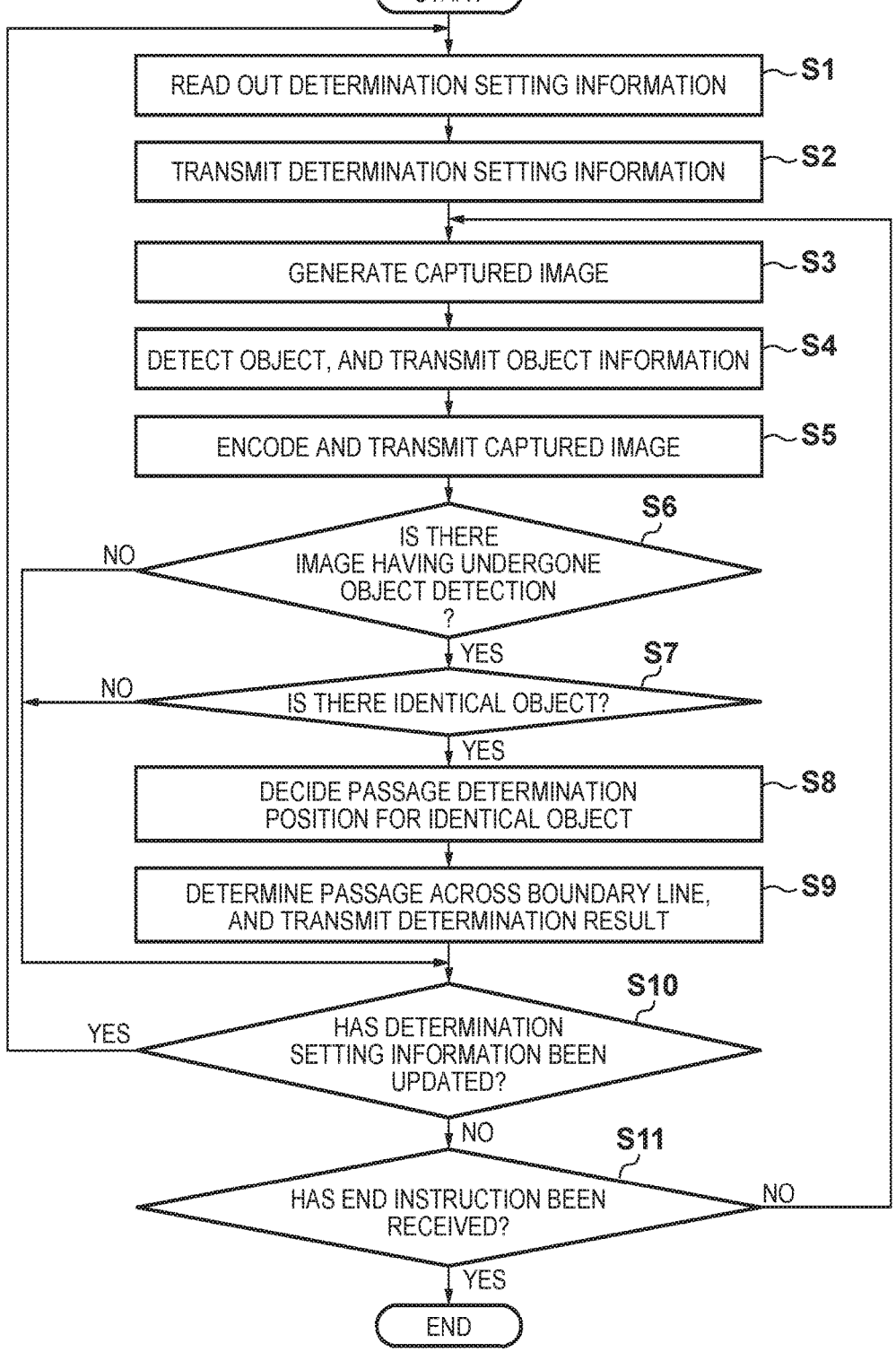
FIG. 7 is a flowchart illustrating an example of processing by the image capturing apparatus according to the first embodiment.
Figure 8:
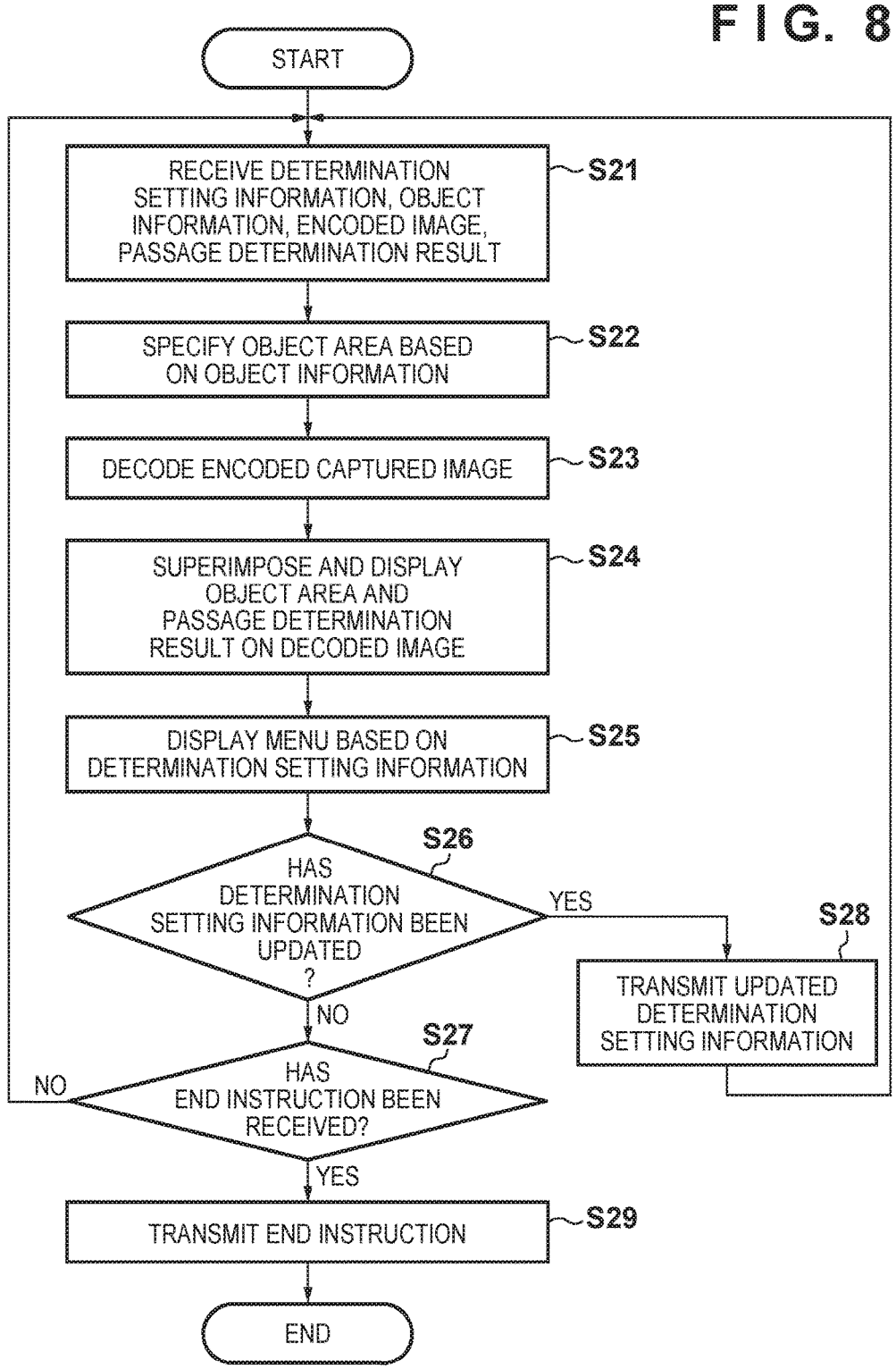
FIG. 8 is a flowchart illustrating an example of processing by the information processing apparatus according to the first embodiment.

FIGS. 7 and 8 are flowcharts illustrating an example of the overall processing procedure of the system in the presence of the passage detection settings from when an image is captured until an object detection result is displayed. Processing by the image capturing apparatus 1 will first be described with reference to FIG. 7.

The transmission/reception unit 150 reads out the determination setting information for passage determination from the storage unit 122 (step S1). The determination setting information contains boundary line information for uniquely deciding the boundary line 320 based on coordinate information and the like on an image plane, and position setting information indicating a determination position in the object area 322 to be used to determine whether the object has passed the boundary line 320. Note that the determination position is selected from, for example, the determination positions displayed in the menu 330 shown in FIG. 6, and the boundary line 320 can be designated within the image display area 310 shown in FIG. 6.

The transmission/reception unit 150 transmits the readout determination setting information to the information processing apparatus 2 (step S2). After that, processing in steps S3 to S9 to be described below is repeated until a change in passage determination settings is received from the information processing apparatus 2 in step S10 or an end instruction is received in step S11.

The A/D converter 103 converts, into a digital signal, an electric signal received by the sensor 102 through the lens 101, and the image generation unit 104 of the succeeding stage generates a digital image (captured image) based on the digital signal (step S3). The generated digital image is copied, and sent to the image encoding unit 110 and object detection unit 120.

The object detection unit 120 detects object information from the digital image by performing image analysis, and the image information transmission unit 140 transmits the detected object information to the information processing apparatus 2 (step S4). The object information indicates the position (coordinates) and size of the detected object area. The image encoding unit 110 encodes the digital image into an image format represented by, for example, JPEG, and the image information transmission unit 140 transmits the encoded image to the information processing apparatus 2 (step S5).

Note that to transmit the object information to the information processing apparatus 2, the object information itself may be transmitted. The present invention, however, is not limited to this. For example, the object detection unit 120 may send the object information to the image encoding unit 110, which may include the object information in the header of the encoded image, thereby transmitting the object information. Furthermore, although the processes in steps S4 and S5 are described as successive processes in the flowchart for descriptive convenience, it is apparent that they can be parallelly executed.

The object area contained in the object information need only be information for uniquely deciding an area, on a plane, which surrounds the detected object in an arbitrary shape. If, for example, the area of the detected object is normalized to a rectangle, the object information may represent the object area using the coordinates of the upper right corner and those of the lower left corner.

Referring back to FIG. 7, since it is necessary to consider the temporal continuity of the object to perform passage detection, it is necessary to compare the object with an object detected in an immediately preceding captured image. The object determination unit 121 thus confirms whether there is an image having undergone object detection (step S6). If there is no image having undergone object detection, that is, immediately after initialization or start of the apparatus, there is no object to be compared with, and thus the process advances to step S10.

On the other hand, if there is an image to be compared with, the object determination unit 121 confirms whether the detected object is identical with the object detected in the comparison target image (step S7). If the objects are not identical, the detected object cannot be identified as an object which has passed the boundary line, and thus the process advances to step S10. Whether the objects are identical can be determined by comparing the positions and sizes of the objects.

If the objects are identical, the decision unit 123 decides a determination position for passage detection for each object (object area) based on the above-described detection position information (step S8). The determination position is decided based on the information of the position and size (for example, the coordinates of diagonal points of a rectangle) of the detected object area 322, and the position setting information of the determination position (for example, the central position) read out from the storage unit 122. Based on the determination position for each object and the boundary line information, the passage determination unit 130 determines whether the object has passed the boundary line, and then transmits the determination result to the information processing apparatus 2 (step S9). Note that in step S9, only if it is determined that the object has passed the boundary line, the determination result is transmitted, and if it is determined that the object has not passed the boundary line, it is not necessary to transmit the determination result.

The above-described processing in steps S3 to S9 is repeated until the passage determination setting information is updated (while NOs are determined in steps S10 and S11). For example, if the passage determination setting information has been updated (YES in step S10), for example, if updated determination setting information is received from the information processing apparatus 2, the process returns to step S1, and starts again the processing from step S1 to perform processing using the new determination setting information. If an end instruction is given (YES in step S11), the process is terminated. The end instruction is received from, for example, the information processing apparatus 2.

Processing by the information processing apparatus 2 will be described next with reference to FIG. 8. In the information processing apparatus 2, the image information reception unit 201 receives, from the image capturing apparatus 1, the determination setting information transmitted in step S2, the object information transmitted in step S4, the encoded image transmitted in step S5, and the passage detection determination result transmitted in step S9 (step S21). The pieces of information need not be received at the same time in step S21, and each piece of information need only be received, as appropriate. The object information confirmation unit 204 specifies the position (coordinates) and size of the detected object area based on the received object information (step S22). The image decoding unit 202 decodes the received encoded image (step S23).

The image generation unit 230 generates an image by superimposing the object area specified in step S22 and the passage determination result received in step S21 on the image decoded in step S23, and outputs the generated image to the display device 3 via the display output unit 231 (step S24). Based on the determination setting information received in step S21, the image generation unit 230 generates display elements of the menu 330 and sets them as part of the image (step S25). Display contents at this time are as described above with reference to FIG. 6. Note that the determination position (currently applied determination position) obtained from the determination setting information received from the image capturing apparatus 1 is displayed by the filled radio button in the menu 330. Note that the menu 330 may be superimposed and displayed on the decoded image, or may be displayed in an area different from the decoded image, as shown in FIG. 6.

The above processing in steps S21 to S25 is repeated until the passage determination setting information is updated (for example, set or updated in processing to be described later with reference to a flowchart shown in FIG. 9) (while NOs are determined in steps S26 and S27). If another determination position is selected in the menu 330, or the boundary line 320 is moved/rotated to update the passage determination setting information (YES in step S26), the process advances to step S28. In this case, the transmission/reception unit 220 transmits the updated determination setting information to the image capturing apparatus 1 (step S28), and the returns the process to step S21. The image capturing apparatus 1 receives the determination setting information in step S10 of FIG. 7.

If an end instruction is given through the user interface (YES in step S27), the transmission/reception unit 220 transmits an end instruction to the image capturing apparatus 1 (step S29), and the process is terminated.

Figure 9:
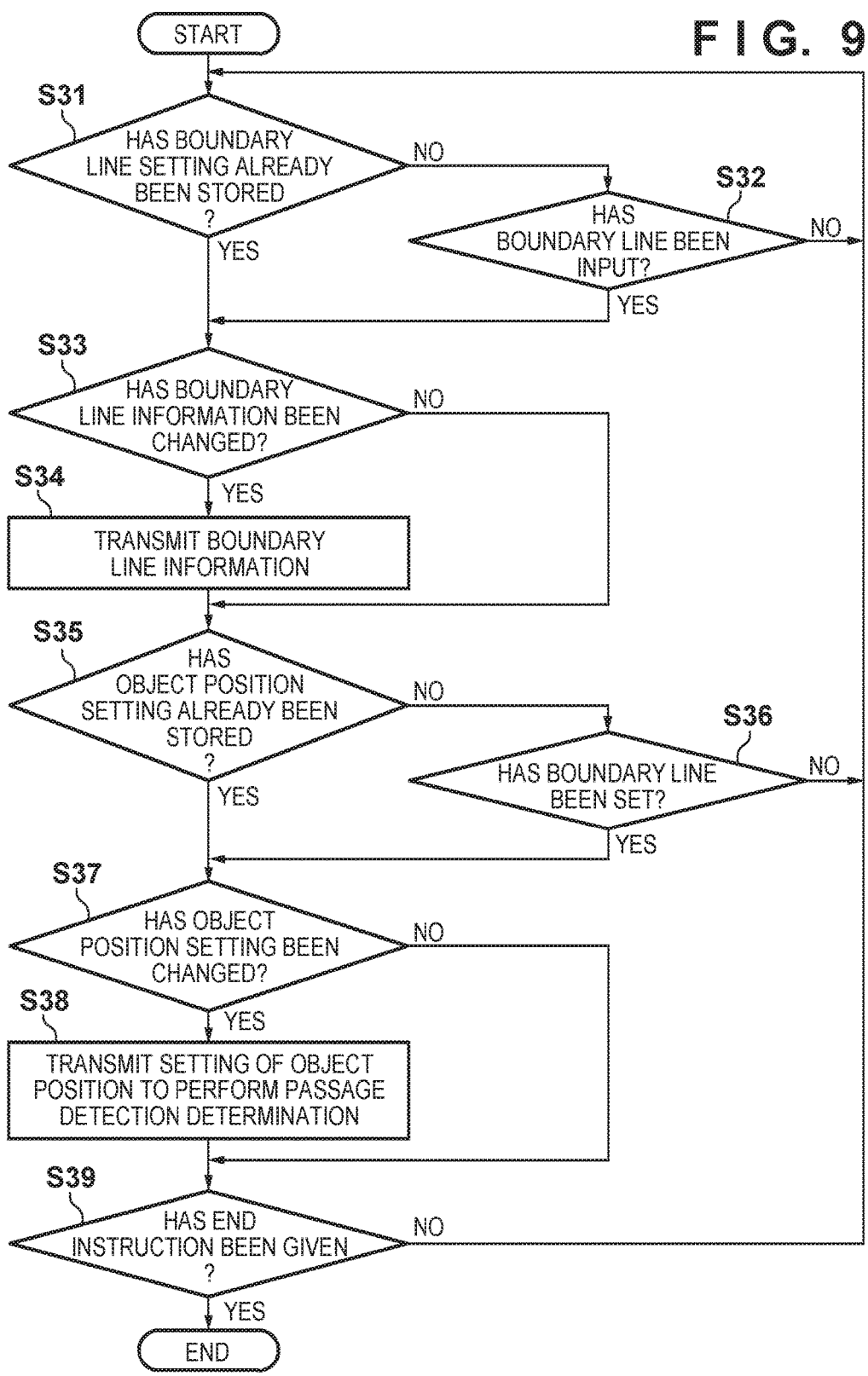
FIG. 9 is a flowchart illustrating processing for initializing or changing passage detection settings according to the first embodiment.

FIG. 9 is a flowchart illustrating an example of the processing procedure of the information processing apparatus 2 when initializing or changing passage detection settings. The transmission/reception unit 220 confirms whether boundary line information (information for specifying the boundary line 320) has already been stored in the storage unit 122 (step S31). This can be done by, for example, determining whether the determination setting information received from the image capturing apparatus 1 contains boundary line information. If no boundary line information is set, the transmission/reception unit 220 stands by until boundary line information is input to the information processing apparatus 2 (step S32).

If boundary line information has been stored (YES in step S31) or has been input to the information processing apparatus 2 (YES in step S32), the transmission/reception unit 220 confirms whether the boundary line information has been newly input or changed (step S33). If it is determined that the boundary line information has been newly input or changed, the transmission/reception unit 220 transmits the boundary line information as an update instruction to the image capturing apparatus 1 (step S34). In this way, the updated boundary information is saved in the storage unit 122 of the image capturing apparatus 1.

The transmission/reception unit 220 confirms whether position setting information indicating a determination position, in the object area, to perform passage detection determination has already been stored in the storage unit 122 (step S35). The position setting information is also contained in the determination setting information received from the image capturing apparatus 1. If there is no position information, the above processing is repeated until a determination position is input/set through the menu 330 (NO in step S35 and NO in step S36). On the other hand, if position information has been stored (YES in step S35) or position information has been input (YES in step S36), the transmission/reception unit 220 confirms whether the determination position setting information has been changed (step S37).

If the determination position setting information has been changed or newly input, the transmission/reception unit 220 transmits the position information as an update instruction to the image capturing apparatus 1 (step S38). In this way, the updated determination position is saved in the storage unit 122 of the image capturing apparatus 1. The above processing is repeated until an end instruction is given (step S39).

Note that the image capturing apparatus 1 detects an update notification by receiving the update instruction transmitted in step S34 or S38 via the transmission/reception unit 150. Upon detecting the update notification, the process branches to YES in step S10 of FIG. 7, thereby starting passage determination processing using the new determination setting information.

With the above arrangement, the user can instruct the position of the object to be determined in passage detection that the object has passed the boundary line, thereby enabling to set desired passage determination conditions.

An example of a passage determination setting system according to the second embodiment will be described below with reference to the accompanying drawings. Note that a description of points according to the above-described first embodiment will be omitted. The main difference from the first embodiment is that it is possible to superimpose and display, on an object area 322, a determination position set by the user to determine in an information processing apparatus 2 that an object has passed a boundary line.

Figure 10:
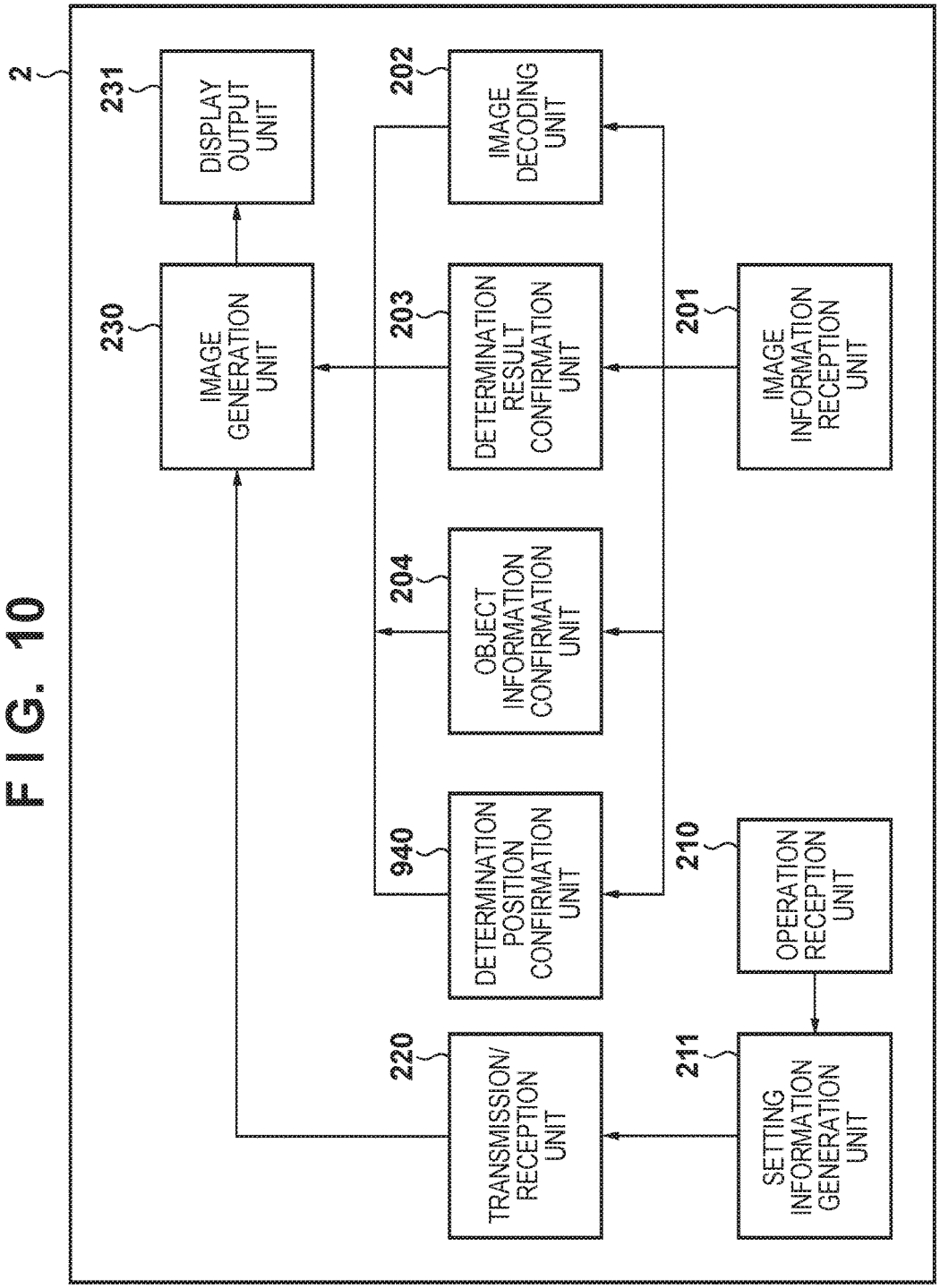
FIG. 10 is a block diagram showing an example of the hardware arrangement of an information processing apparatus 2 according to the second embodiment.

The functional blocks of an image capturing apparatus 1 according to the second embodiment are the same as those shown in FIG. 4. Note that an image information transmission unit 140 transmits position information, for each object area, decided by a decision unit 123. FIG. 10 is a block diagram showing an example of the functional arrangement of the information processing apparatus 2 according to the second embodiment. In FIG. 10, the same components as those according to the first embodiment (FIG. 5) have the same reference numerals.

A determination position confirmation unit 940 confirms position information for each object area, which has been received by an image information reception unit 201 from the image capturing apparatus 1, and provides the information to an image generation unit 230. Newly adding the determination position confirmation unit 940 enables the image generation unit 230 to superimpose and display a detection position used for passage detection determination for each object area extracted by an object information confirmation unit 204, thereby generating an image.

Figure 11:
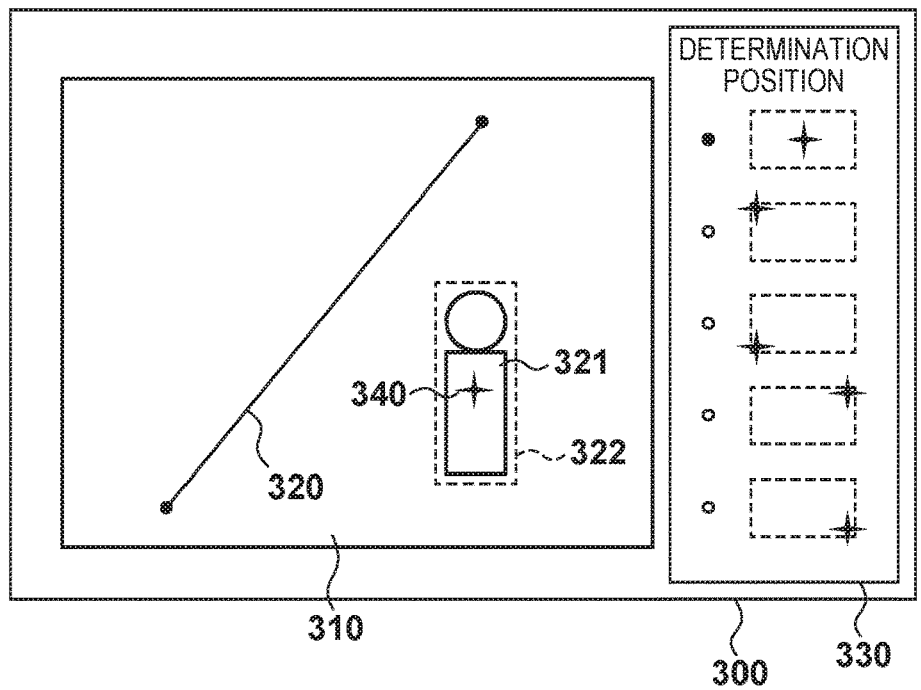
FIG. 11 is a view showing an example of a passage detection setting screen according to the second embodiment.

FIG. 11 is a view showing an example of a passage determination setting screen displayed on a display device 3. The same display elements as those on the passage determination screen (FIG. 6) described in the first embodiment have the same reference numerals as those in FIG. 6. Reference numeral 340 denotes a determination position which has been used for passage detection determination and is superimposed and displayed. This arrangement allows the user to readily confirm that the object has passed the boundary line as set. With respect to superimposition and display of the determination position used for passage detection determination, display of the determination position is different from that of an object area (for example, in a different shape and color). This enables the user to readily discriminate between the object area and display of the position used for passage detection determination, thereby allowing easier recognition. In a menu 330, determination positions within a rectangle are represented by graphics instead of characters such as "central" and "upper left" shown in FIG. 6. This menu display allows the user to more intuitively select a determination position.

Note that in the above-described first and second embodiments, a point within the object area is used as a determination position to determine whether the object has passed the boundary line. The present invention, however, is not limited to this. Some types of determination positions will be explained below.

Figure 12:
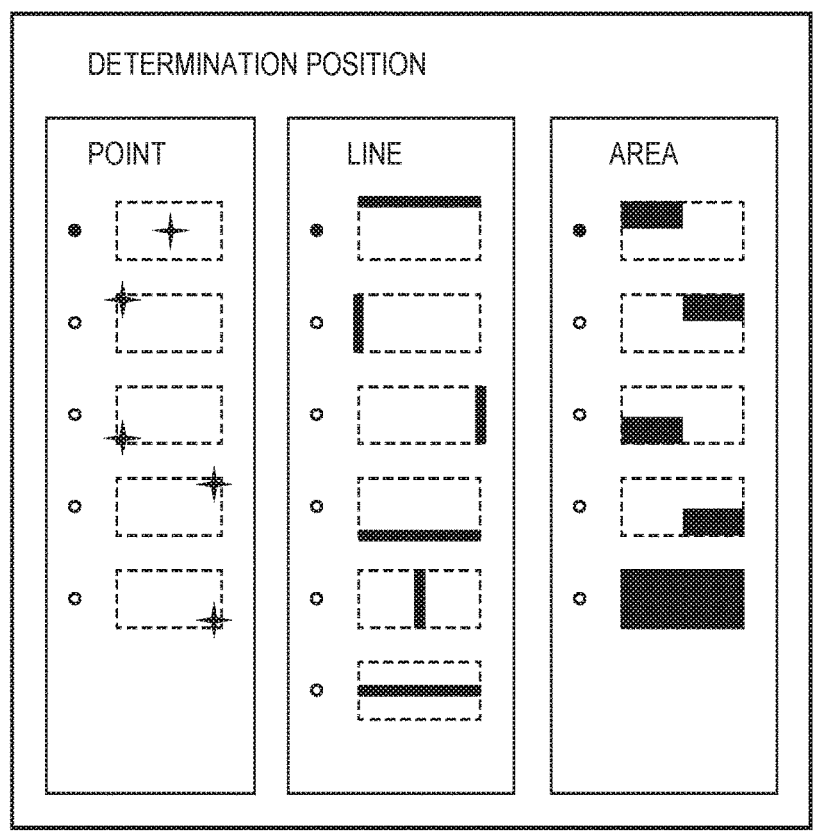
FIG. 12 is a view showing representative examples of a determination position setting.

FIG. 12 shows representative determination position settings. Although a point has been used as a determination position above, it is also possible to make determination using a line or plane (area), as shown in FIG. 12, as a matter of course. The user may set a type of determination position (a point, line, or plane). Furthermore, all determination positions represented by points, lines, and planes may be displayed in the menu 330, and then the user may be prompted to select a desired determination position.

If, for example, a rectangle is used as an object area and a point is used as a determination position, it is possible to set "barycenter or center", "upper left corner", "lower left corner", "upper right corner", or "lower right corner" of the object area. Alternatively, if a rectangle is used as an object area and a line is used as a determination position, it is possible to set "upper edge", "left edge", "right edge", "lower edge", "vertical center", or "horizontal center". Furthermore, if a rectangle is used as an object area and a plane is used as a determination position, it is possible to set an "upper left", "upper right", "lower left", or "lower right" partial region, or "whole" indicating the whole region.

If determination is performed using a line or plane, it may be determined that the object has passed the boundary line when all or some of the set positions have passed the boundary line. Therefore, the determination method may be decided in advance, or a user interface for enabling the user to make a setting may be additionally provided. Note that in an object area 322 when a plane (area) is used as a determination position, it is possible to indicate, to the user, a set determination position (area) set in the object area 322 by filling it with a predetermined translucent color.

A passage determination setting system according to the third embodiment will be described below with reference to the accompanying drawings. The main difference from the first and second embodiments is that an information processing apparatus 2 can perform passage detection based on encoded images saved in a recording medium or the like.

Figure 13:
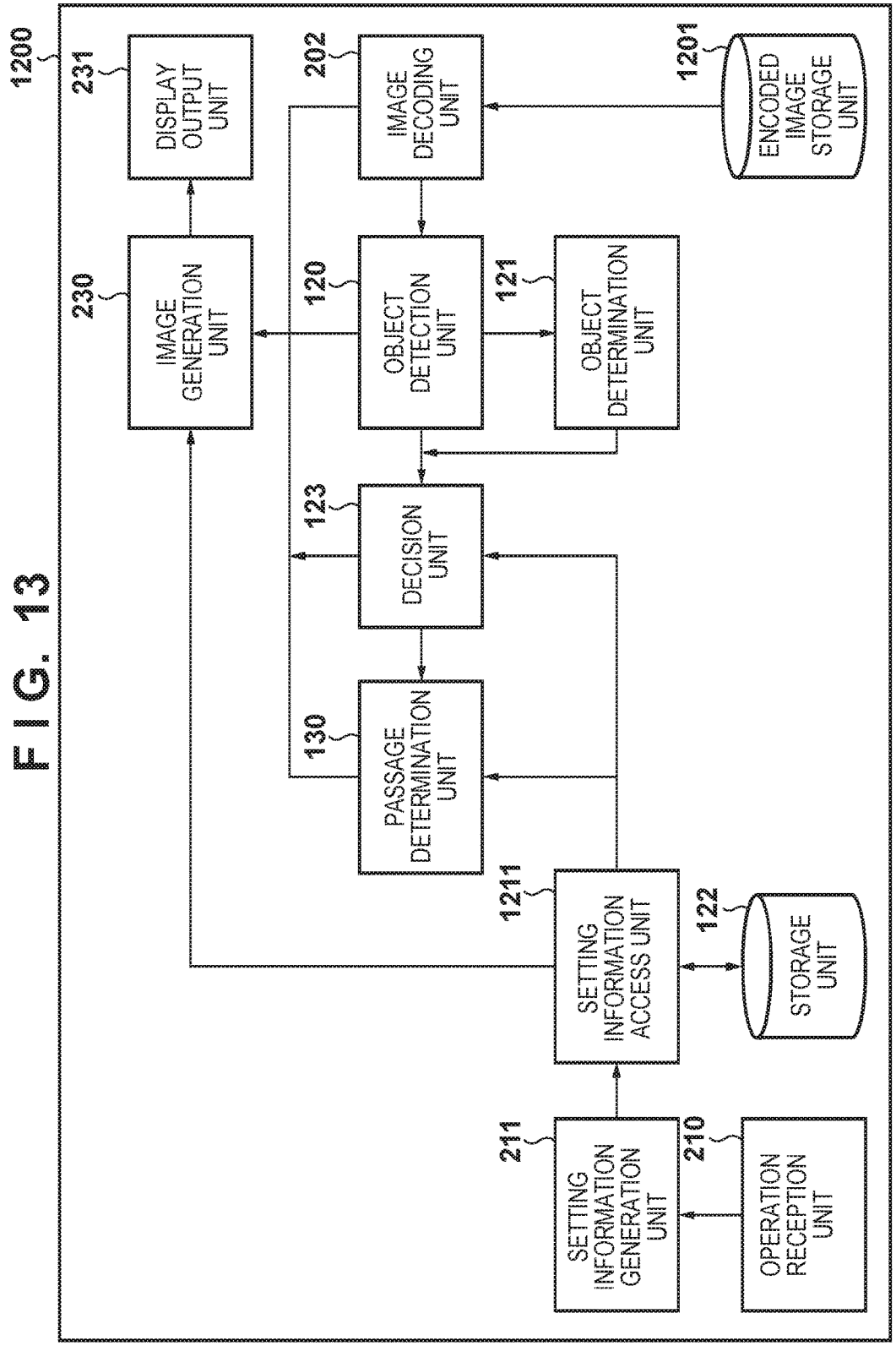
FIG. 13 is a block diagram showing an example of the system configuration of a passage determination setting system according to the third embodiment.

FIG. 13 is a block diagram showing an example of the functional arrangement of the system. In FIG. 13, the same components as those in the first and second embodiments (FIGS. 4, 5, and 10) have the same reference numerals as those in FIGS. 4, 5, and 10.

Reference numeral 1200 denotes a passage determination setting system; and 1201, an encoded image storage unit storing encoded images. An image decoding unit 202 decodes an encoded image stored in the encoded image storage unit 1201, and provides the thus obtained image to an object detection unit 120 and image generation unit 230. The operations of an object determination unit 121, decision unit 123, and passage determination unit 130 are as described above in the first embodiment but respective processing results are provided to the image generation unit 230. The image generation unit 230 displays a user interface shown in FIG. 6 or 11 on a display device 3.

A setting information access unit 1211 reads out determination setting information from a storage unit 122, and supplies position information to the decision unit 123 and information for specifying a boundary line to the passage determination unit 130 and image generation unit 230.

With this arrangement, the passage determination setting system 1200 can perform display as described with reference to FIG. 6 or 11 using the encoded images stored in the encoded image storage unit 1201. The passage determination setting system 1200, therefore, allows the user to readily confirm and change passage determination conditions for images stored in the past. Note that the arrangement shown in FIG. 13 may receive an encoded image output from the image capturing apparatus 1, instead of reading out an encoded image from the encoded image storage unit 1201. In this case, the image capturing apparatus 1 need only encode and transmit a captured image, and need not have a function of executing passage determination processing.

A passage determination setting system according to the fourth embodiment will be described below with reference to the accompanying drawings. Note that a description of points according to the first, second, or third embodiment will be omitted. The main difference from the first, second, and third embodiments is that a passage direction is added to processing, by an image capturing apparatus 1, of determining whether an object has passed a boundary line, and passage determination settings in an information processing apparatus 2.

A setting information generation unit 211 of the information processing apparatus 2 according to the fourth embodiment generates/updates determination setting information added with a passage direction based on an operation received from an operation reception unit 210. A transmission/reception unit 220 transmits the determination setting information including the passage direction to the image capturing apparatus 1 to save it in a storage unit 122, and receives the current determination setting information from the image capturing apparatus 1.

The difference of a passage detection processing procedure according to the fourth embodiment from the first embodiment will be described with reference to FIG. 7. Determination setting information read out by a transmission/reception unit 150 in step S1 includes a passage direction setting. A passage determination unit 130 determines (step S9) whether an object has passed a boundary line, as follows. That is, based on a determination position, boundary line information, and a passage direction setting for each object, it is determined that the object has passed a boundary line if the determination position has passed the boundary line and the moving direction of the determination position with respect to the boundary line coincides with the passage direction setting. In other states, it is determined that the object has not passed the boundary line. The determination result is transmitted to the information processing apparatus 2.

Figure 14:
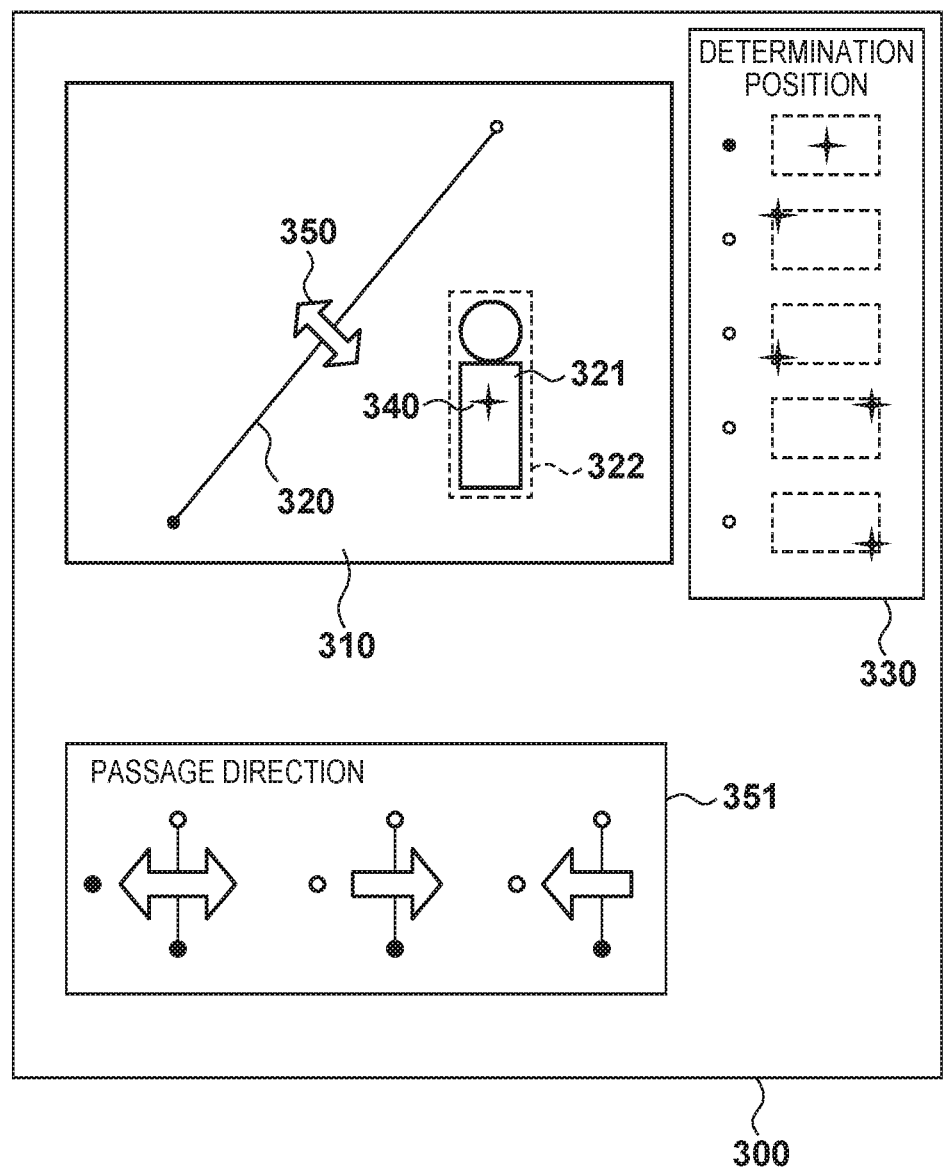
FIG. 14 is a view showing an example of a passage detection setting screen according to the fourth embodiment.

FIG. 14 shows an example of a passage determination setting screen according to the fourth embodiment. FIG. 14 is different from FIG. 6 in that a passage direction 350 is displayed on a boundary line 320, and a passage direction menu 351 for selecting, as a passage direction, a setting of both directions, the right direction, or the left direction with respect to a direction from the start point to the end point of the boundary line. Display of a passage direction by the arrow of the passage direction 350 changes depending on selection through the passage direction menu 351.

Referring to FIG. 14, a setting of both directions, the right direction, or the left direction with respect to a direction from the start point (a closed circle) to the end point (an open circle) is selectable. Furthermore, a closed circle on the left side of an arrow indicates that a setting of both the directions has been selected. If a setting of the right direction is selected, the closed circle on the left side of the double-headed arrow is changed to an open circle, and an open circle on the left side of a right arrow is changed to a closed circle.

In FIG. 14, one boundary line 320 is shown. It is, however, possible to set a plurality of boundary lines 320, and set a different passage direction for each boundary line. If there are a plurality of boundary lines, a passage direction set for a selected boundary line is reflected in the passage direction menu 351. The user can confirm a passage direction selection state as a passage determination condition, and select and set a passage direction using the passage direction menu 351, similarly to setting and changing of a determination position using a menu 330 as described above.

Note that in each of the above-described embodiments, passage determination conditions may be commonly set for all objects, or may be individually set for each object. To make passage determination conditions settable for each object, it is only necessary to specify individual objects by face recognition or the like, assign identifiers to the respective objects, and hold passage determination conditions in association with the identifiers, respectively.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-146086, filed Jun. 28, 2012, which is hereby incorporated by reference herein in its entirety.

What is claimed is:
1. An image processing apparatus comprising:
a display control unit configured to display first and second areas on a display screen, the first area being for designating one of a plurality of determination positions of an object region that indicates an area of an object moving in an image captured by a capturing device, and the second area being for displaying the image;

a first acceptance unit configured to accept a user operation for setting a line on the image in the second area, wherein the display control unit displays the line in the second area;

a second acceptance unit configured to accept a user operation for designating one of the plurality of determination positions in the first area, wherein the designated one of the plurality of determination positions is used for determining whether the moving object has passed the line set in the image;

a transmission unit configured to transmit information indicating the line set by the first acceptance unit and information indicating the designated one of the plurality of determination positions designated by the second acceptance unit to the capturing device so that the capturing device detects whether the designated one of the plurality of determination positions crosses the line; and a superposition unit configured to superpose, on the second area, the determination position designated from among the plurality of determination positions displayed in the first area.

2. The apparatus according to claim 1, further comprising a selection unit configured to select a direction in which the determination position passes the line set in the image in accordance with a user selection operation.

3. The apparatus according to claim 1, wherein the display control unit displays the first area and the second area on the display screen at the same time.

4. A method of controlling an image processing apparatus comprising:

displaying first and second areas on a display screen, the first area being for designating one of a plurality of determination positions of an object region that indicates an area of an object moving in an image captured by a capturing device, and the second area being for displaying the image;

accepting a first user operation for setting a line on the image in the second area, and displaying the line in the second area;

accepting a second user operation for designating one of the plurality of determination positions in the first area, wherein the designated one of the plurality of determination positions is used for determining whether the moving object has passed the line set in the image;

transmitting information indicating the line set by the first user operation and information indicating the designated one of the plurality of determination positons designated by the second user operation to the capturing device so that the capturing device detects whether the designated one of the plurality of determination positions crosses the line; and superposing, on the second area, the determination position designated from among the plurality of determination positions displayed in the first area.

5. The method according to claim 4, further comprising selecting a direction in which the determination position passes the line set in the image in accordance with a user selection operation.

6. The method according to claim 4, wherein the first area and the second area are displayed on the display screen at the same time.

7. A non-transitory computer-readable storage medium storing a computer program for causing a computer to perform a method of controlling an image processing apparatus, the method comprising:

displaying first and second areas on a display screen, the first area being for designating one of a plurality of determination positions of an object region that indicates an area of an object moving in an image captured by the capturing device, and the second area being for displaying the image;

accepting a first user operation for setting a line on the image in the second area, and displaying the line in the second area;

accepting a second user operation for designating one of the plurality of determination positions in the first area, wherein the designated one of the plurality of determination positions is used for determining whether the moving object has passed the line set in the image;

transmitting information indicating the line set by the first user operation and information indicating the designated one of the plurality of determination positions designated by the second user operation to the capturing device so that the capturing device detects whether the designated one of the plurality of determination positions crosses the line; and superposing, on the second area, the determination position designated from among the plurality of determination positions displayed in the first area.

8. The storage medium according to claim 7, wherein the setting method further comprises selecting a direction in which the determination position passes the line set in the image in accordance with a user selection operation.

9. The storage medium according to claim 7, wherein the first area and the second area are displayed on the display screen at the same time.

* * * * *